(12) United States Patent
Niwano et al.

(10) Patent No.: US 6,522,674 B1
(45) Date of Patent: Feb. 18, 2003

(54) PULSED LASER CONTROL SYSTEM

(75) Inventors: Motoki Niwano, Oyama (JP); Shoichi Sakanishi, Hiratsuka (JP); Takeshi Okamoto, Chigasaki (JP); Hideyuki Hayashi, Oyama (JP); Hiroshi Tanaka, Mooka (JP)

(73) Assignee: Komatsu Ltd., Tokyo (JP)

( * ) Notice: Subject to any disclaimer, the term of this patent is extended or adjusted under 35 U.S.C. 154(b) by 90 days.

(21) Appl. No.: 09/666,139

(22) Filed: Sep. 20, 2000

(30) Foreign Application Priority Data

Sep. 21, 1999 (JP) .......................................... 11-267149

(51) Int. Cl.$^7$ ................................................. H01S 3/00
(52) U.S. Cl. ............................ 372/30; 372/29; 372/33; 372/55; 372/57
(58) Field of Search ............................. 372/29, 33, 55, 372/57, 30

(56) References Cited

U.S. PATENT DOCUMENTS

| | | | |
|---|---|---|---|
| 5,127,067 A | * 6/1992 | Delcoco et al. | 385/24 |
| 5,136,666 A | * 8/1992 | Anderson et al. | 385/24 |
| 5,365,344 A | * 11/1994 | Eda et al. | 359/124 |
| 5,463,650 A | * 10/1995 | Ito et al. | 372/57 |
| 5,657,334 A | * 8/1997 | Das et al. | 372/33 |

FOREIGN PATENT DOCUMENTS

| | | |
|---|---|---|
| JP | 6384334 | 4/1988 |
| JP | 3281452 | 12/1991 |
| JP | 784962 | 3/1995 |

* cited by examiner

*Primary Examiner*—Paul Ip
*Assistant Examiner*—Leith Al-Nazer
(74) *Attorney, Agent, or Firm*—Varndell & Varndell, PLLC (57) ABSTRACT

The pulsed laser control system comprises a plurality of controllers (2) through (6) for controlling devices (21) through (30) constituting the pulsed laser apparatus (1); parallel communication lines (P1) to (P4) for parallel connection of the plurality of controllers (2) through (6); an Ethernet (S) for serial connection of the plurality of controllers (2) through (6); parallel communication line (PP) for parallel connection between the external apparatus (10) and the main controller (2); and an Ethernet (SS) for serial connection between the external apparatus (10) and the main controller (2); wherein the parallel communication lines (P1) to (P4) and (PP) transmit signals for which realtime performance is required. With this construction, even if design changes are frequently made to a pulsed laser apparatus, the changes can be made easily and with little expansion space. Moreover, management of the devices constituting the pulsed laser apparatus can be easily performed.

2 Claims, 10 Drawing Sheets

PULSED LASER CONTROL SYSTEM

BACKGROUND OF THE INVENTION

1. Field of the invention

The present invention relates to a pulsed laser control system for controlling a highly repetitive pulsed laser, such as an excimer laser.

2. Description of the related art

Generally, reducing projection aligners (steppers) use laser beams in the ultraviolet range such as excimer laser beams and the like. When a pulsed laser apparatus such as excimer laser device is used in steppers, such apparatus must be controlled for each pulse because highly stabilized laser beam output is required for the steppers.

Figure 9:
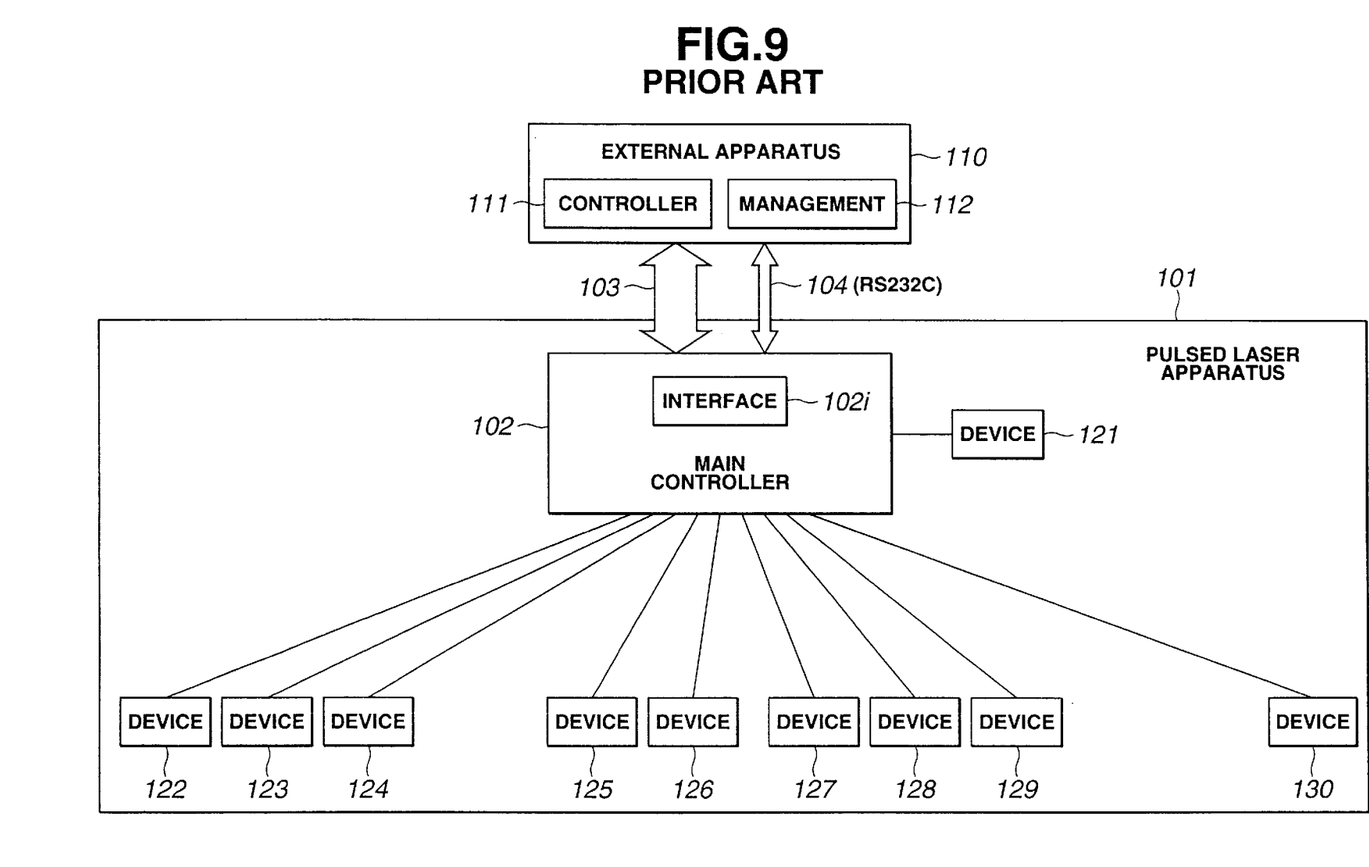
FIG. 9 is a drawing showing the configuration of a conventional pulsed laser control system.

FIG. 9 shows a general configuration of the laser control system in a conventional pulsed laser apparatus. In FIG. 9, a main controller 102 effects centralized control of devices 121 through 130 constituting a pulsed laser apparatus 102.

The main controller 102 comprises an interface 102i and is connected to an external apparatus 110, such as a stepper, by means of the interface 102i. The external apparatus 110 comprises a controller 111 for controlling the external apparatus 110, and a management device 112 for managing the external apparatus 110 as well as the pulsed laser apparatus 101. The external apparatus 110 and the pulsed laser apparatus 101 are connected by a parallel communication line 103 and a serial communication line 104 such as RS232C.

Figure 10:
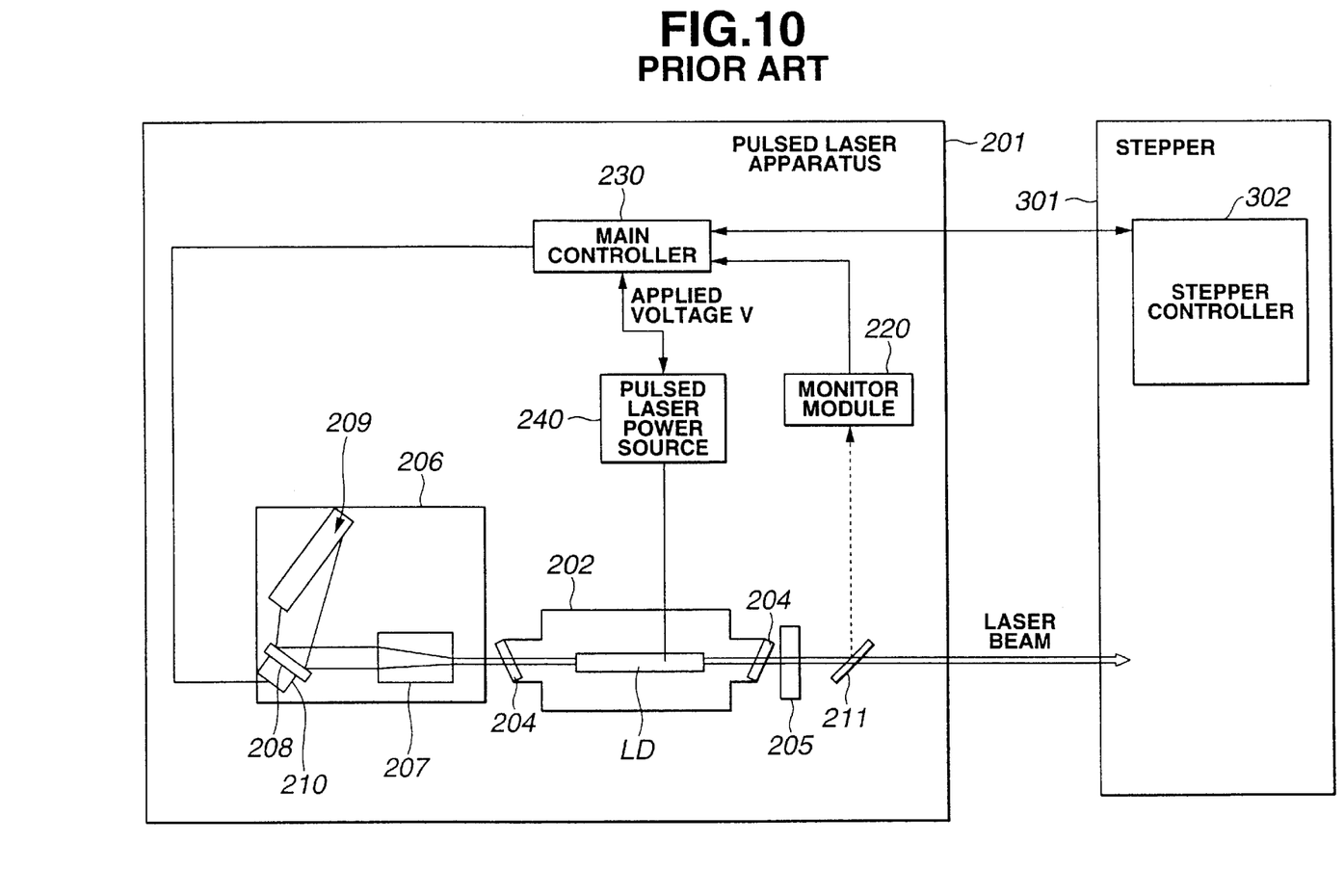
FIG. 10 is a drawing a showing a specific example to which the conventional pulsed laser control system is applied.

With reference to FIG. 10, a particular configuration of the laser control system is explained for the case where the external apparatus 110 is a stepper and the pulsed laser apparatus 201 is an excimer laser device. Laser chamber 202 comprises a laser discharge unit LD serving as discharge electrodes in which positive and negative electrodes are arranged in opposition to each other and perpendicularly to this drawing, and laser medium gas comprising halogen gas, noble gas, buffer gas or the like filling the laser chamber 202 is excited by discharge between the electrodes in the laser discharge unit LD so that laser oscillation is effected.

Windows 204 are provided in both laser radiation apertures of the laser chamber 202. Also, a front mirror 205 is provided on the laser beam output side of the laser chamber 202. Further, a band-narrowing module 206 is provided on the side facing a front mirror 205. The band-narrowing module 206 comprises an optical beam-expanding system 20, a mirror 208, a grating 209 that is an angular distributed wavelength selecting element, and a mirror adjuster 210.

An optical cavity is formed between the front mirror 205 and grating 209. The mirror adjuster 210 adjusts the angle of incidence of the laser beam striking the grating 209 by adjusting the angle of the mirror 208. The wavelength selection adjustment of the grating 209 including this mirror adjustment is effected under control by the main controller 230. This control by the controller 230 is effected on the basis of the results of monitoring the laser output beam by a monitor module 220, which will be discussed below.

Laser beam generated in the laser chamber 202 strikes the band-narrowing module 206. More particularly, the laser beam strikes the optical beam-expanding system 207, by which the beam width is expanded in the direction perpendicular to the discharge direction thereof. Furthermore, the laser beam strikes the grating 209 and is diffracted thereby. As a result, only the part of the laser beam with the prescribed wavelength is turned back in the same direction as the incident beam. The beam width of the laser beam turned around by the grating 209 is reduced by the optical beam-expanding system 207 and then the laser beam enters the laser chamber 202. The laser beam is then passed through the laser chamber 202 and amplified. A part of such laser beam is extracted via the front mirror 205 as an output beam, while the remainder is again returned to the laser chamber 202 and amplified.

On the laser beam output side, a beam splitter 211 is provided for splitting a part of the laser beam output from the front mirror 205, so that the laser beam extracted by the beam splitter 211 is input to a monitor module 220. The monitor module 220 detects the beam width, output intensity, and, if necessary, beam profile of the input laser beam, and sends the detected data to the main controller 230. The main controller 230 effects control of the band-narrowing module 206 and the pulsed laser power source device 240 on the basis of these detection results.

When the pulsed laser apparatus 201 actually effects highly repetitive pulsed oscillation continuously, a laser beam emission signal and energy signal are sent from a stepper controller 302. The main controller 230 controls the mirror adjuster 210 and the pulsed laser power source device 240 to cause pulse oscillation based on these signals. This control is carried out for each pulse.

However, in the conventional pulsed laser control system discussed above, all the devices 121 through 130 within the pulsed laser apparatus 101 are controlled in a centralized manner by the main controller 102 only. Therefore, the load is too large for the main controller to effect control for each pulse. In the event that a design change or the like is to be made in the pulsed laser apparatus 101, such load limitations and limitations to expansion hinder construction of an adequate pulsed laser control system and, in addition, considerable work and time are required for the design changes.

Also, in the conventional pulsed laser control system, although centralized control is carried out by the main controller 102, the connections to each device are made by buses between the boards, and a harness is laid round for that purpose. The space within the housing of the pulsed laser apparatus 101 is therefore limited and it is not possible to ensure sufficient space required for the design changes.

Furthermore, because the status log of the pulsed laser apparatus 101 is captured by downloading directly from the pulsed laser apparatus 101, time and efforts are required for the management processing for the pulsed laser apparatus 101.

SUMMARY OF THE INVENTION

It is an object of the present invention to provide a pulsed laser control system that resolves these problems, with which changes can be made easily and within a small expansion space, even if design changes are frequently made in the pulsed laser apparatus, and that can easily effect management of the devices constituting the pulsed laser apparatus.

The pulsed laser control system according to the present invention comprises: a plurality of controllers for controlling each of the devices constituting a pulsed laser apparatus; a main controller for controlling the abovementioned plurality of controllers and external apparatus; parallel communication means for parallel communication connections between the abovementioned plurality of controllers and the abovementioned main controller; and serial communication means for serial communication connections between the abovementioned plurality of controllers and the abovementioned main controller by means of a serial network; wherein the abovementioned parallel communication means transmit signals for which realtime performance is required.

With the present invention, the load for controlling the pulsed laser apparatus is distributed among the main controller and the plurality of controllers. Signals for which realtime performance is required are transmitted at a high speed using parallel communication means. The main controller and the plurality of controllers are connected on a network by serial communication means such as Ethernet, for example. As a result, changes involving increase or reduction in [the number of] devices can be handled flexibly and easily.

Also, the space used for the purpose of control within the pulsed laser apparatus is reduced. This can contribute to the realization of compact pulsed laser apparatus.

Furthermore, because the distances of connection from the main controller and plurality of controllers to the devices connected thereto becomes short, good communication can be realized without the need of worrying about the effects of noise or the like.

In the pulsed laser control system according to the second invention, the parallel communication means and the serial communication means are both connected to the external apparatus.

With the second invention, in addition to the operating effects of the first invention, it is made possible to transmit signals, for which real time performance is required, at a high speed from the external apparatus by the parallel connection to the external apparatus. Also, management of the pulsed laser apparatus can be performed remotely because the external apparatus can be connected to a network by serial communication means.

DETAILED DESCRIPTION OF THE PREFERRED EMBODIMENTS

In the following, an embodiment of the present invention is explained with reference to the accompanying drawings.

Figure 1:
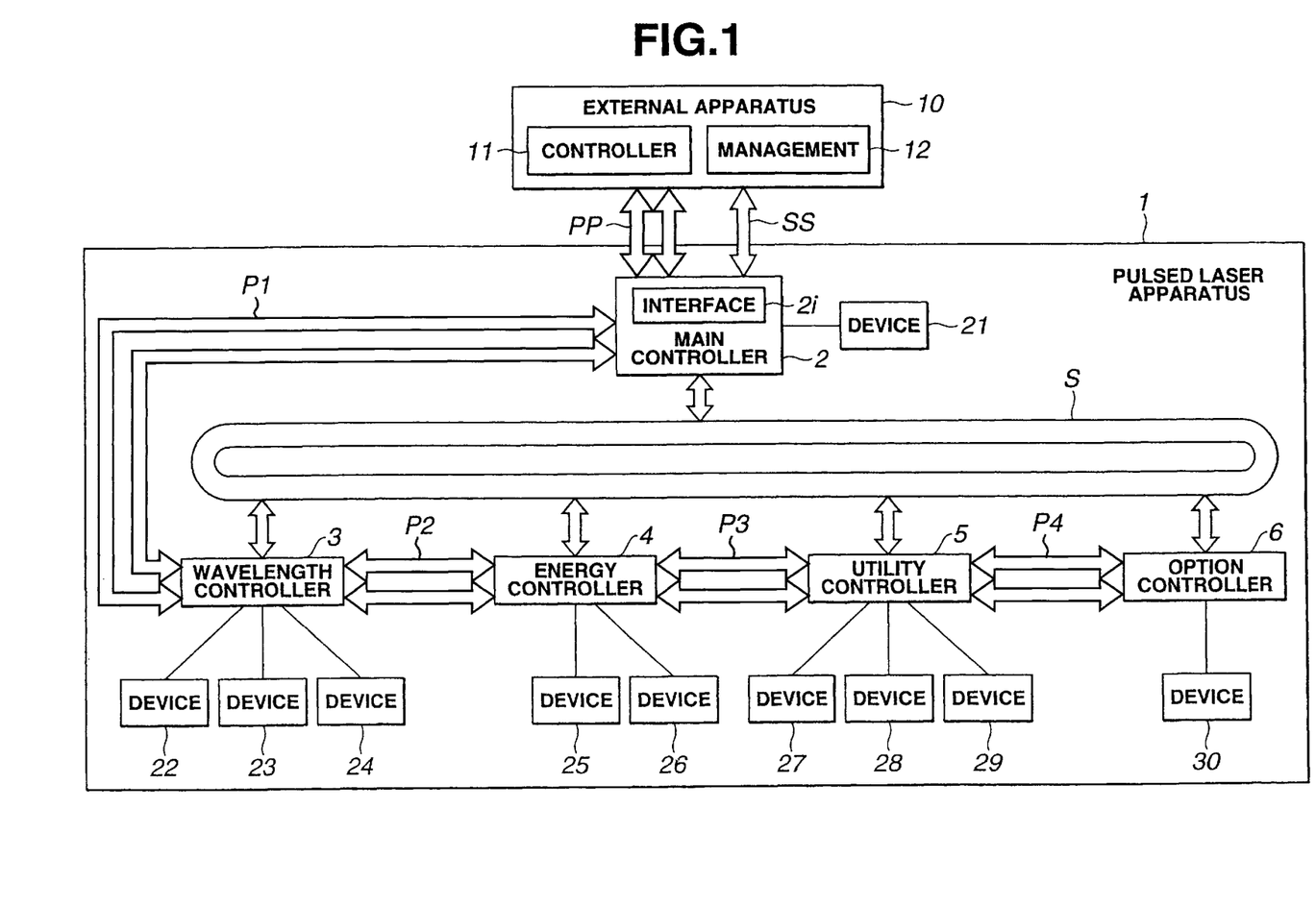
FIG. 1 shows the configuration of a pulsed laser control system according to an embodiment of the present invention.

FIG. 1 is a drawing showing the configuration of a pulsed laser control system that is an embodiment of the present invention. In FIG. 1, the pulsed laser apparatus 1 realized by an excimer laser or the like is connected in serial communication to an external apparatus 10 realized by a stepper or the like by means of a serial communication line SS such as Ethernet which is a serial communications network. The pulsed laser apparatus is also connected in parallel communication to the external apparatus 10 by means of a parallel communication line PP.

The pulsed laser apparatus 1 comprises a main controller 2 connected to device 21, a wavelength controller 3 connected to devices 22 through 24, an energy controller connected to devices 25, 26, a utility controller 5 connected to devices 27 through 29, and an option controller 6 connected to device 30. The devices are a pulsed power source device and so on constituting the pulsed laser apparatus 1. The main controller 2 comprises an interface 2i for connecting the abovementioned serial communication line SS and parallel communication line PP.

An Ethernet S is constituted within the pulsed laser apparatus 1 and the controllers 2 through 6 are thereby connected in serial communication at a high speed. Also the controllers 2 through 6 are connected in parallel communication by means of parallel communication lines P1 to P4.

The wavelength controller 3 monitors the wavelength, beam width, and so forth of the current laser beam, for example, and controls the wavelength based on these monitoring results. The energy controller 4 calculates the necessary energy for the pulsed laser power source device. The utility controller 5 monitors and controls the status of a prescribed device. The option controller 6 controls newly added optional functions.

On the other hand, the external apparatus 10 comprises a controller 11, realized by a stepper controller or the like, and a management device 12 for controlling the pulsed laser apparatus 1 and external apparatus 10 itself.

An example of the procedure for controlling the pulsed laser apparatus 1 using Ethernets S and SS and parallel communication lines P1 through P4 and PP is explained here with reference to FIGS. 2 through 8.

Figure 2:
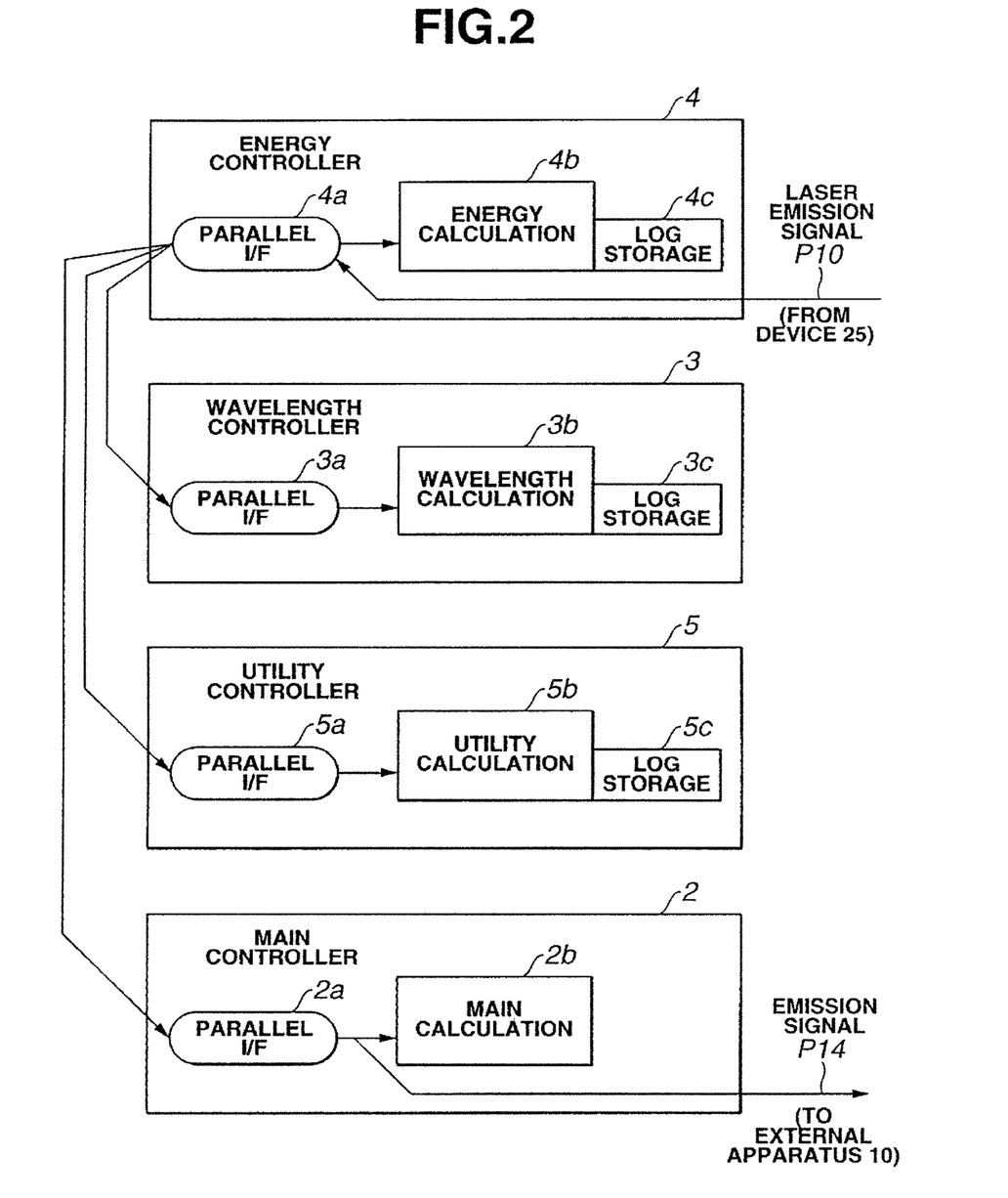
FIG. 2 shows an example of communications processing among the controllers during laser emission.

In FIG. 2, the energy controller 4 comprises a parallel interface 4a for connecting the parallel communication line, an energy calculation unit 4b, and a log storage unit 4c. The wavelength controller 3 comprises a parallel interface 3a for connecting the parallel communication line, a wavelength calculation unit 3b, and a log storage unit 3c. The utility controller 5 comprises a parallel interface 5a for connecting the parallel communication line, a utility calculation unit 5b, and a log storage unit 5c. The main controller 2 comprises a parallel interface 2a for connecting the parallel communication line and a main calculation unit 2b.

When a laser emission signal P10 is input to the energy controller 4 from the device 25, this laser emission signal P10 is transmitted in parallel to the wavelength controller 3 by means of the parallel communication line, the utility controller 5, and main controller 2. At the same time, the parallel interfaces 4a, 3a, 5a and 2a transmit the laser emission signal P10 to the energy calculation unit 4b, the wavelength calculation unit 3b, the utility calculation unit 5b, and the main calculation unit 2b respectively. Furthermore, the main controller 2 outputs an emission signal P14 indicating signal reception to the external apparatus 10 via a parallel communication line. The connections of the parallel communication line in this case are assigned to each specific signal by means of a one signal/one pair line.

Figure 3:
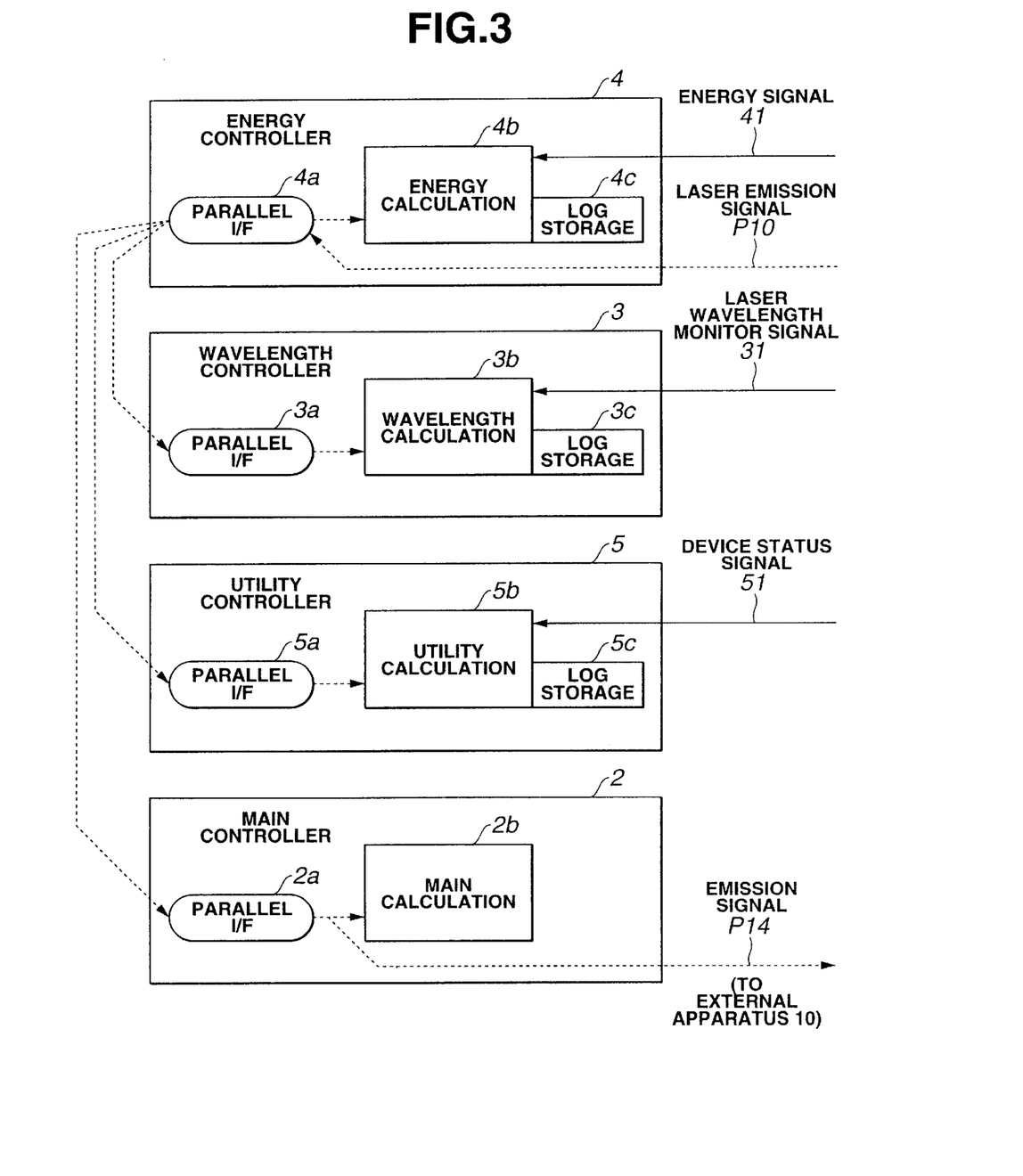
FIG. 3 shows an example of communications processing among the controllers during laser emission.

In FIG. 3, the energy controller 4 captures an energy signal 41 from the connected device at the time when the laser emission signal P10 is received, and stores the signal in the log storage unit 4c. Similarly, the wavelength controller 3 captures the laser wavelength monitor signal 31 from the connected device at the time when the laser emission signal P10 is received, and stores the signal in the log storage unit 3c. Similarly, the utility controller 5 captures the device status signal 51 from the connected device at the time when the laser emission signal P10 is received, and stores the signal in the log storage unit 5c.

Figure 4:
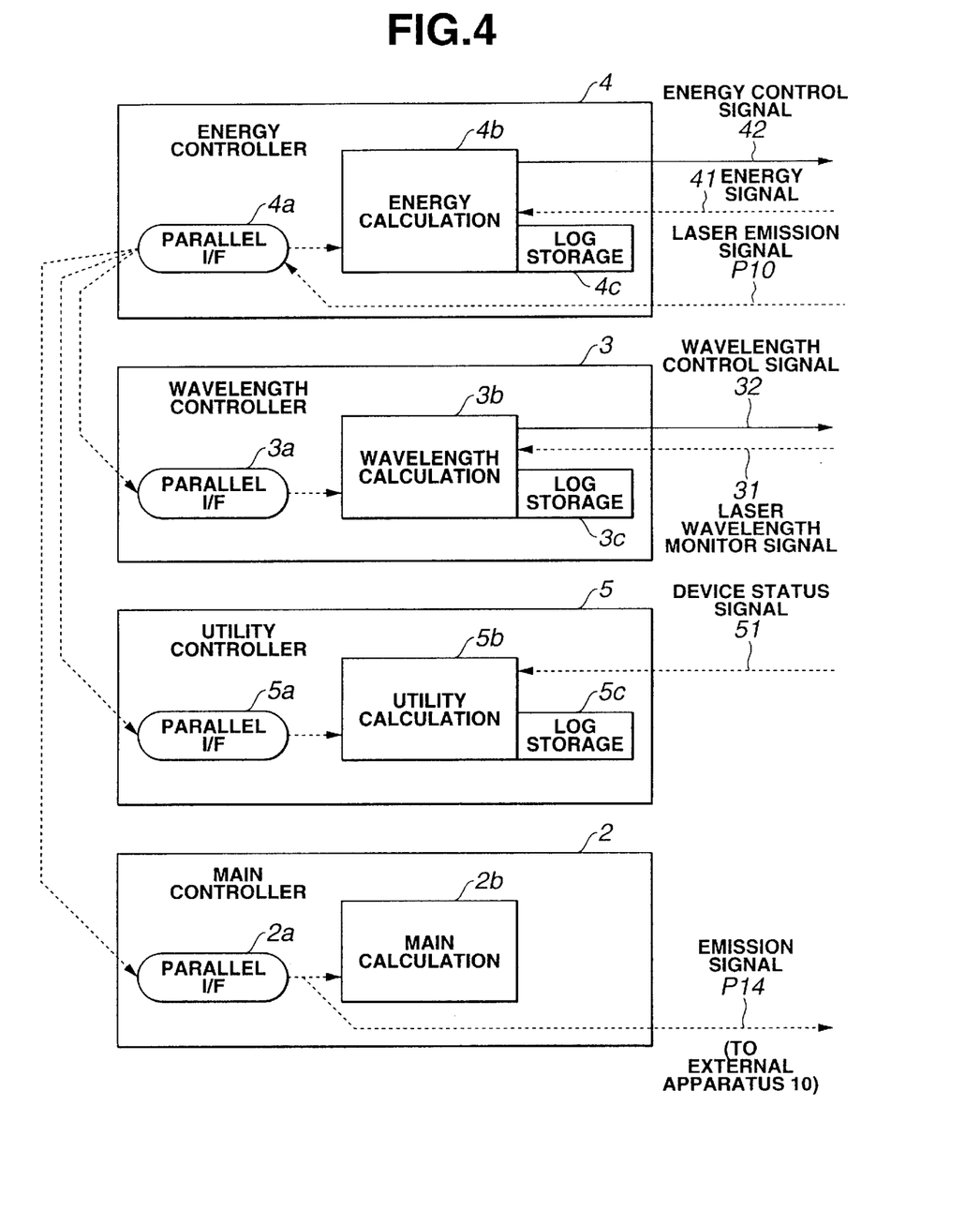
FIG. 4 shows an example of communications processing among the controllers during laser emission.

In FIG. 4, the energy calculation unit 4b then calculates an energy for the next pulse based on the captured energy signal 41 and outputs that value as an energy control signal 42 to an device such as the pulsed laser power source device. Also, the wavelength calculation unit 3b calculates adjustment data to be adjusted at the next pulse based on the laser wavelength monitor signal 31 and outputs that value as a wavelength control signal 32 to an device such as the mirror adjuster.

Figure 5:
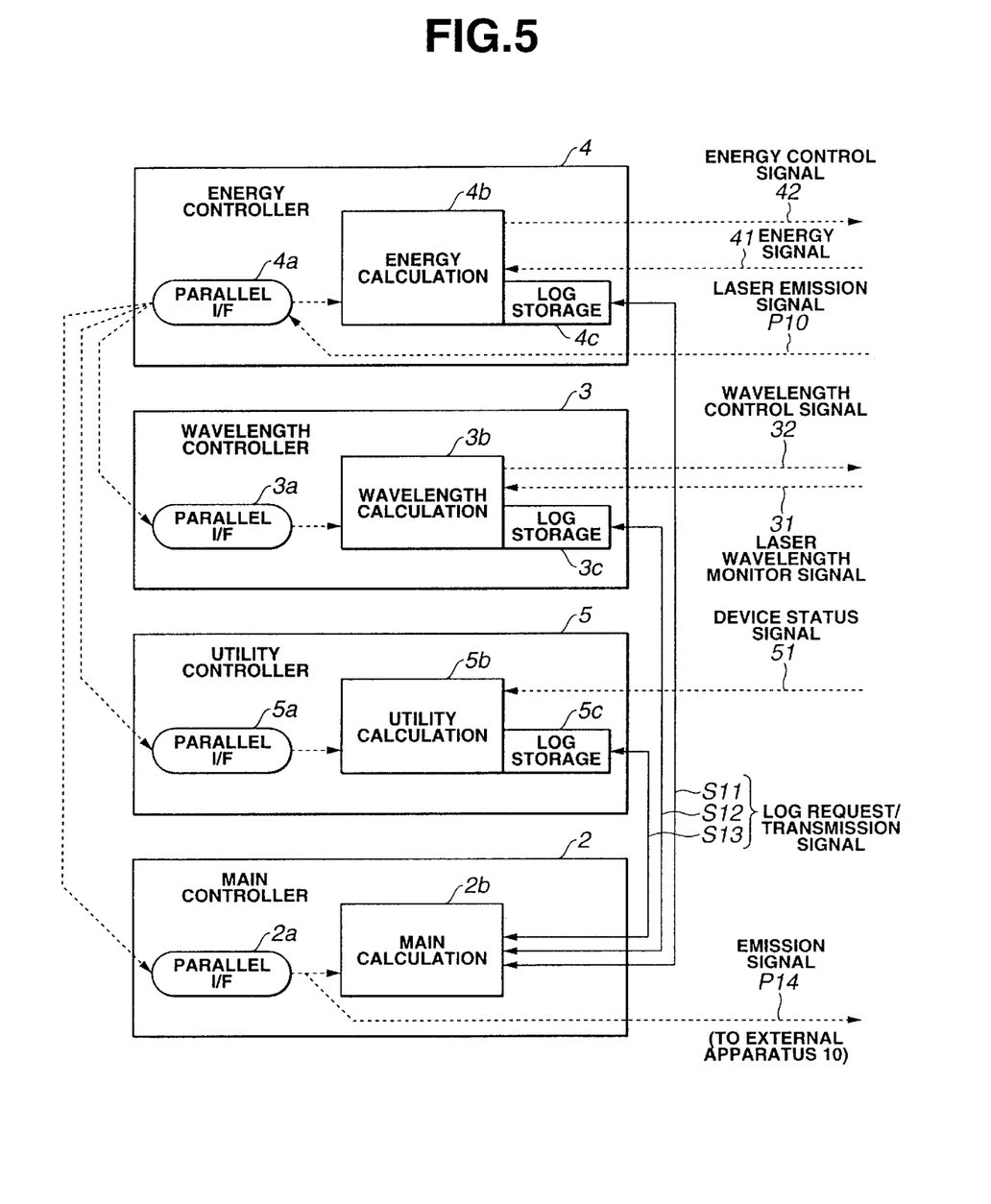
FIG. 5 shows an example of communications processing among the controllers during laser emission.

After that, as shown in FIG. 5, the main controller 2 uses the high-speed serial communication line of the Ethernet S to make a request for log data held in log storage units 3c through 5c, and acquires the log data.

Figure 6:
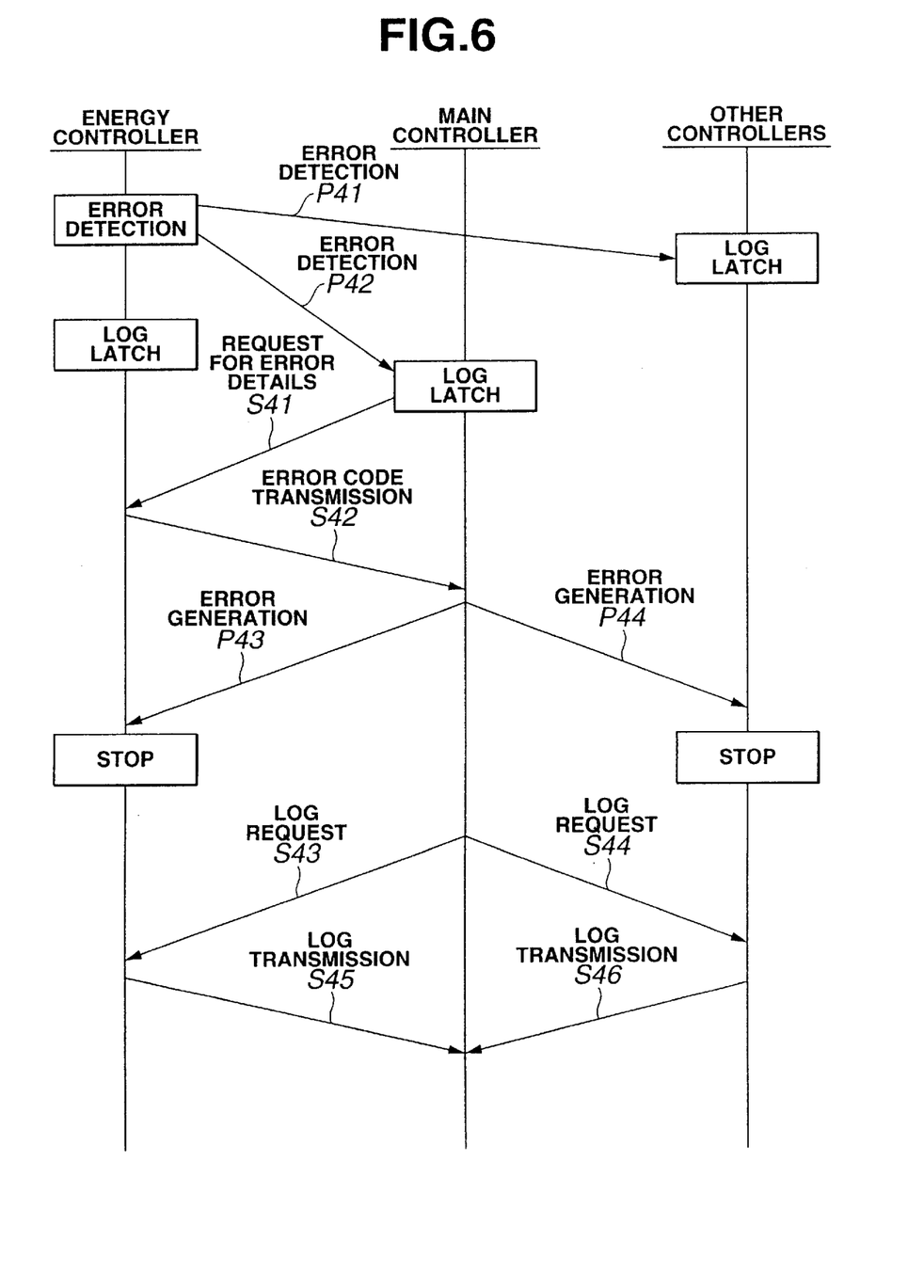
FIG. 6 shows an example of communications processing among the controllers during error detection.

Next, error processing to be carried out when any of the controllers detects an error is explained with reference to FIG. 6. In FIG. 6, when the energy controller 4 has detected an error, for example, the energy controller 4 uses the parallel communication line and sends error detection events P41, P42 to the main controller 2 and other controllers 3, 5, 6. The main controller 2 and other controllers 3, 5, 6 that have received these events P41, P42 latch these events as log data. Meanwhile, the energy controller 4 that detected the error also latches the error detection as log data.

Thereafter, the main controller 2 uses the Ethernet S to send requests S41, S42 for error details to the energy controller 4 and receives the error codes showing the error details from the energy controller 4. Then, the main controller 2 confirms the error codes received, and notifies the main controller 2 and other controllers 2, 3, 5, 6, meaning all the controllers, of error occurrence P43, P44 using the parallel communication line. The energy controller 4 and other controllers 2, 3, 5, 6 stop the connected devices upon receiving this notification.

After that, the main controller 2 uses the Ethernet S and makes requests S43, S44 for stored log data to the energy controller 4 and other controllers 2, 3, 5, 6. The energy controller 4 and other controllers 3, 5, 6 effect transmissions S45, S46 of log data to the main controller 2, whereby the main controller 2 acquires the log data. The log data acquired in this way can be captured and managed by the management device 12 within the external apparatus 10 via the Ethernet SS, for example.

Figure 7:
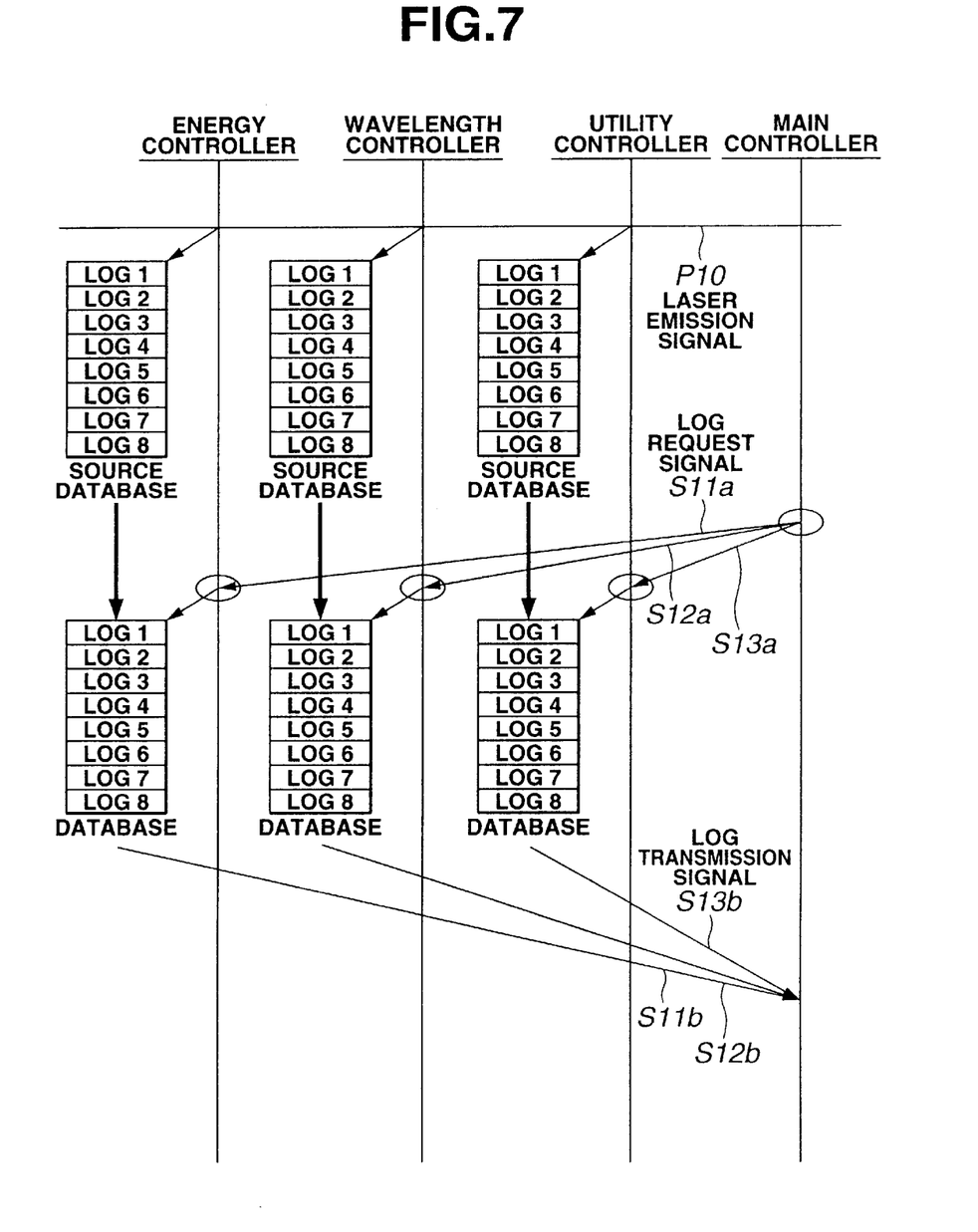
FIG. 7 shows an example of communications processing among the controllers relating to the acquisition of log data.

The retention and acquisition of those log data are carried out, as shown in FIG. 7, in such a way that the controllers 2 through 5 hold the log data in the respective source database in synchronization with the reception of the laser emission signal P10, in other words, in synchronization with each pulse via the parallel communication line, and then the main controller 2 requests and acquires the log data via the Ethernet S. In this case, because of acquisition of log data in synchronization with a pulse, the main controller 2 can acquire and manage the log data for each pulse.

Figure 8:
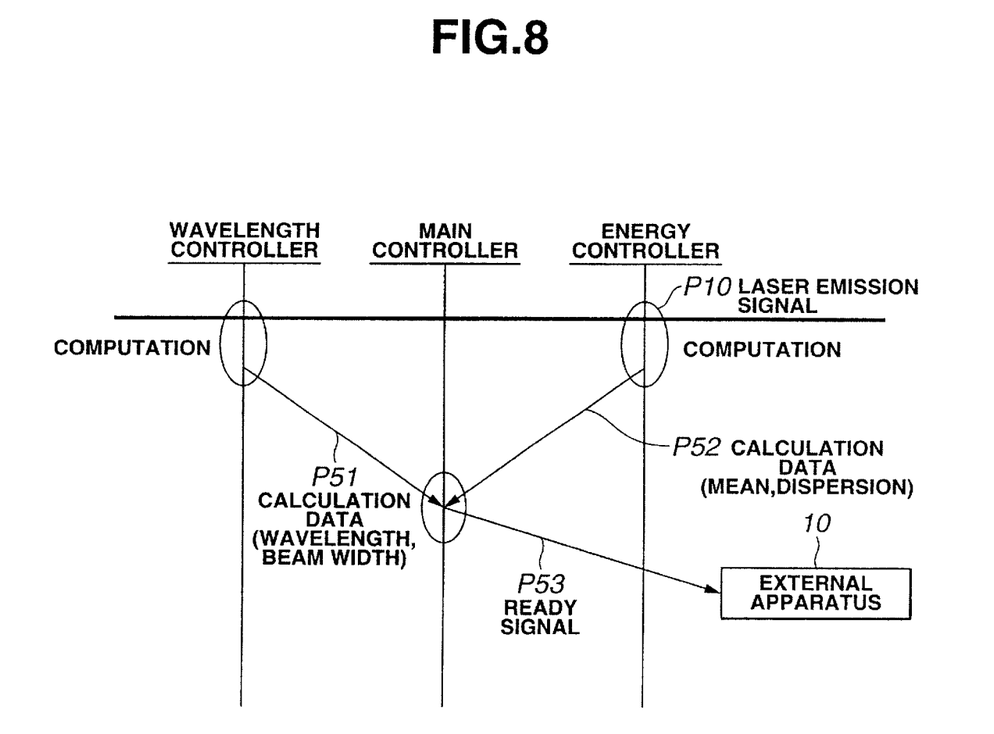
FIG. 8 shows an example of communications processing for realtime acquisition of the status of changes in beam quality during laser emission.

On the other hand, the external apparatus 10 sometimes needs to acquire changes in beam quality on the pulsed laser apparatus 1 side in real time and effect control and management. For example, FIG. 8 shows the processing to be carried out when the beam quality on the pulsed laser apparatus 1 side is output to the external apparatus 10 side in real time. In FIG. 8, the wavelength controller 3 and energy controller 4 receive the laser emission signal P10 via the parallel communication line, whereupon the wavelength calculation unit 3b calculates the wavelength and beam width at that time and sends the computation results to the main controller 2 using the parallel communication line; the energy calculation unit 4b calculates the mean value and dispersion of the energy and sends the computation results to the main controller 2 using the parallel communication line; and the main controller 2 sends these computation results to the external device 10 in real time. In this manner, the beam quality of the pulsed laser apparatus 1 can be monitored remotely and in real time.

With the present embodiment, the load of control in the pulsed laser apparatus 1 is divided and distributed among the plurality of controllers 2 through 6; the controllers 2 through 6 are connected by an Ethernet, as a high-speed serial line, so that expansion or the like involved by design changes or the like can be easily effected. Also, because the controllers 2 through 6 are connected by parallel communication lines, time critical signals, that cannot tolerate communication delays due to Ethernet communication speed or temporary increase of load, can be sent assuredly in real time. In other words, the hybrid system using serial communication lines and parallel communication lines ensures high speed communications among the controllers 2 through 6.

Also, because the controllers 2 through 6 can be provided close to the devices connected thereto, the devices can be connected by short wiring without laying around a harness or the like. As a result, it is possible to construct a communication control system for which it is relatively unnecessary to consider the effects of noise or the like.

Furthermore, because the log held in each controller 2 through 6 can be acquired using the Ethernet S, subsequent maintenance and management become easy. In particular, because the external apparatus 10 and pulsed laser apparatus 1 are connected by Ethernet and parallel communication lines, control and management of the pulsed laser apparatus 1 can be performed remotely.

What is claimed is:

1. A pulsed laser control system comprising:

a plurality of controllers for controlling devices constituting a pulsed laser apparatus;

a main controller for controlling the plurality of controllers and an external apparatus;

parallel communication means for parallel communication connections between the plurality of controllers and the main controller; and serial communication means for serial communication connections between the plurality of controllers and the main controller by means of a serial network;

wherein the parallel communication means transmits signals for which realtime performance is required.

2. The pulsed laser control system according to claim 1, wherein the parallel communication means and the serial communication means both include means for connecting the external apparatus to the main controller, respectively.

* * * * *